United States Patent Office 3,776,885
Patented Dec. 4, 1973

3,776,885
METHOD OF CURING POLYMERS WITH AZO COMPOUNDS
Ronald Edward MacLeay, Williamsville, N.Y., assignor to Pennwalt Corporation, Philadelphia, Pa.
No Drawing. Filed Oct. 28, 1971, Ser. No. 193,568
Int. Cl. C08f 11/04
U.S. Cl. 260—46.5 G     13 Claims

ABSTRACT OF THE DISCLOSURE

Azo compounds of the formula

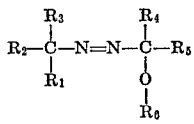

in which $R_1$ is aliphatic hydrocarbon, cyano, aryl, aralkyl or $R_6O$—;
$R_2$, $R_3$ and $R_4$ are aliphatic hydrocarbon;
$R_5$ is aliphatic hydrocarbon, aryloxyalkyl, alkoxyalkyl, aryl alkoxycarbonylalkyl, acyloxyalkyl, hydroxyalkyl, aralkyl, acylalkyl, carboxyalkyl, cyanoalkyl, haloalkyl or t-alkylperoxyalkyl;
$R_2$ and $R_3$ and $R_4$ and $R_5$ can together form a bivalent aliphatic hydrocarbon radical; and
$R_6$ is aliphatic hydrocarbon, aryl or aralkyl;

are used to cross-link a methyl-vinyl base silicone rubber at a temperature in the range of from above 250° F. to 450° F. until cross-linking is effected.

(A) BACKGROUND OF THE INVENTION AND THE PRIOR ART

This invention relates to a method of curing certain polymers such as polyethylene with cross-linking agents which have heretofore been unknown for this purpose. It has been generally accepted that azo compounds do not abstract hydrogen and consequently do not act as cross-linking agents for polymers such as polyethylene. One exception is found in U.S. Pat. 3,152,107 which discloses certain azo compounds having an aromatic group attached to the azo moiety and containing a strongly electrophylic group on the alpha carbon.

These cross-linking agents have not found commercial acceptance probably due to their relatively high cost and more importantly because they are highly colored compounds. The color of these compounds is presumably due to the presence of the chromophoric azo group attached to an aromatic ring and represents a severe disadvantage in many applications because undecomposed residue of the cross-linking agent causes undesirable discoloration of the polymer.

The cross-linking of polymers such as described herein is usually accomplished with peroxides and diperoxides. While very effective, these materials are often quite hazardous due to their explosive nature.

(B) SUMMARY OF THE INVENTION

This invention relates to the curing of polymers such as polyethylene with a class of azo compounds which are free from, or at least reduce, the problems associated with the use of prior art cross-linking agents.

The azo cross-linking agents of this invention have the structural formula

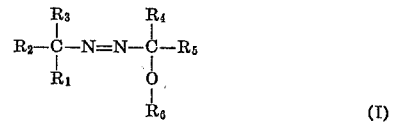

in which $R_1$ is an aliphatic hydrocarbon group of 1 to 8 carbon atoms, preferably an alkyl radical of 1 to 4 carbon atoms, an aralkyl hydrocarbon group of 7 to 14 carbon atoms, preferably an aralkyl radical of 7 to 11 carbon atoms, an aromatic hydrocarbon group of 6 to 14 carbon atoms; preferably an aryl radical of 6 to 10 carbon atoms, cyano or $R_6O$;
$R_2$, $R_3$, and $R_4$ are aliphatic hydrocarbon groups of 1 to 12 carbon atoms, or a cycloaliphatic hydrocarbon group of 3 to 12 carbon atoms, preferably a cycloalkyl radical of 3 to 6 carbon atoms. $R_2$ and $R_3$ are preferably alkyl radicals of 1 to 4 carbon atoms when $R_1$ is not cyano or $R_6O$ and alkyl of 1 to 6 carbons when $R_1$ is cyano or $R_6O$;
$R_2$ and $R_3$ together can form a bivalent aliphatic hydrocarbon radical of 4 to 11 carbon atoms, preferably an alkylene radical of 4 to 7 carbon atoms and the alkylene radical may contain inert substituents such as halo, cyano, alkyl, aryl, acyloxy, and alkoxycarbonyl groups, preferably when $R_1$ is $R_6O$ or cyano;
$R_4$ and $R_5$ together can form a bivalent aliphatic hydrocarbon radical of 4 to 11 carbon atoms, preferably an alkylene radical of 4 to 7 carbon atoms and the bivalent radical may contain inert substituents such as halo, cyano, alkyl, aryl, acyloxy, alkoxycarbonyl and t-alkylperoxy groups;
$R_5$ is an aliphatic hydrocarbon group of 1 to 12 carbon atoms, preferably an alkyl radical of 1 to 6 carbon atoms, a cycloaliphatic hydrocarbon group of 3 to 12 carbon atoms, preferably a cycloalkyl group of 3 to 6 carbon atoms, an aryl, aryloxyalkyl, alkoxyalkyl, alkoxycarbonylalkyl, acyloxyalkyl, hydroxyalkyl, aralkyl, acylalkyl, carboxyalkyl, cyanoalkyl, haloalkyl or t-alkylperoxyalkyl;
$R_6$ is an aliphatic hydrocarbon group of 1 to 12 carbon atoms, preferably an alkyl group of 1 to 6 carbon atoms, a cycloaliphatic hydrocarbon group of 3 to 12 carbon atoms, preferably a cycloalkyl radical of 3 to 6 carbon atoms, aryl or aralkyl having up to 14 carbon atoms.

Preferably, the aliphatic or cycloaliphatic hydrocarbon radicals are alkyl or cycloalkyl radicals of the indicated number of carbon atoms but unsaturation such as in alkenyl groups is permitted. Most preferably, the aliphatic radicals are lower alkyl radicals having 1 to 4 carbon atoms and the cycloaliphatic radicals are lower cycloalkyl radicals having 3 to 6 carbon atoms.

The preferred aryl radicals are phenyl and naphthyl which may be substituted with non-interfering substituents such as alkyl, halogen, alkoxy, alkoxycarbonyl, acyloxy and the like. Most preferably, the aryl radicals are phenyl or phenyl substituted with lower alkyl, lower alkoxy or halogen, especially chloro or bromo.

The aralkyl radicals are preferably phenyl-alkyl or naphthyl alkyl wherein the phenyl or naphthyl groups can contain substituents as mentioned for the aryl group above. Most preferably, the alkyl portion of the radical is lower alkyl of 1 to 6 carbon atoms and the phenyl or naphthyl portion is either unsubstituted or substituted with lower alkyl, lower alkoxy or halogen, especially chloro or bromo. Benzyl is an especially preferred aralkyl group.

The alkyl portion of such groups as alkoxyalkyl, acylalkyl and the like are preferably alkyl of 1 to 4 carbon atoms as are the alkoxy groups so mentioned.

The acyl radicals are preferably alkyl carbonyl in which the alkyl group contains 1 to 4 carbon atoms and benzoyl which can be substituted by non-interfering substituents mentioned above.

The cross-linking agents are blended with the polymer to be cross-linked in the known manner. For instance, the powdered polymer can be thoroughly mixed with the appropriate amount of cross-linking agent and formed into the desired shape which is then heated to effect cross-linking.

The amount of cross-linking agent can vary widely and optimum amounts can be readily determined. Normally, it is recommended that 0.5 to 20 millimoles, preferably 1 to 10 millimoles, of the cross-linking agent be used per 100 parts by weight of the polymer to be cross-linked.

The time-temperature conditions necessary for curing largely depend upon the structure of the cross-linking agent. Customarily, a time equal to about 6–8 times the half-life of the particular azo compound at the desired temperature can be used. The temperature is generally above 250° F. and preferably in the range of 300–450° F. In this temperature range the curing time can vary from about 10 to 200 minutes.

The cross-linking agents described are effective with a variety of polymers, especially polyethylene, silicone rubber, styrene-butadiene rubber, nitrile rubber, and poly-(ethylene-vinyl acetate).

The cross-linkable composition comprising the essential ingredients of polymer and the defined cross-linking agent can contain other materials conventionally used in the production of cross-linked compositions. Among these are co-agents such as sulphur, promoters, coupling agents, fillers, reinforcing materials and fillers. Fillers, especially materials such as carbon black, titanium dioxide, calcium silicate, and alkaline earth metal carbonates are commonly employed in such compositions.

(C) METHODS OF PREPARATION OF THE AZO CROSS-LINKING AGENTS (1) The preparation of the symmetrical azo compounds (i.e. when $R_2$ and $R_3=R_4$ and $R_5$ and $R_1=OR_6$) is described in U.S. Pat. 3,282,912, the disclosure of which is incorporated by reference. The procedure involves reacting an $\alpha$-$\alpha'$-di-(halogeno)-azoalkane with an excess of an anhydrous solvent $R_6OH$ in the presence of an acid-binding agent such as MOH or ROM

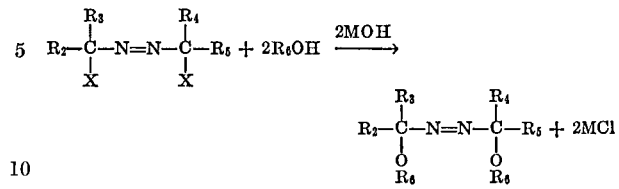

in which

X is halogen, preferably chlorine; and

M is an alkali metal or alkaline earth metal (in which case MOH would be $M(OH)_2$), preferably potassium or sodium. When $R_6$ is an aryl group the reaction is preferably run in methanol instead of excess $R_6OH$.

(2) The asymmetrical azo cross-linking agents where $R_1$ is cyano are also prepared as set forth in U.S. Pat. 3,282,912. The procedure involves reacting an $\alpha$-cyano-$\alpha'$-halogeno-azoalkane with an excess of an anhydrous solvent $R_6OH$ in the presence of an acid-binding agent.

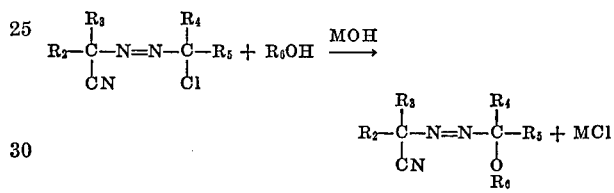

(3) The asymmetrical tertiary aliphatic azo cross-linking agents (i.e., where $R_1$ is aliphatic, aralkyl or aryl) are prepared by a method analogous to that described above in which the appropriate $\alpha$-chloro azo compound is reacted with $R_6OH$. The $\alpha$-chloro-azo compound is obtained by the chlorination of the corresponding t-aliphatic hydrazone. The preparation of the t-aliphatic $\alpha$-chloro-azo compounds is described in U.S. patent application Ser. No. 149,041, filed June 1, 1971. An improved process for their preparation is described in U.S. patent application Ser. No. 79,713, filed Oct. 10, 1970. The disclosures of these pending applications are incorporated by reference. The method of converting the t-aliphatic $\alpha$-chloro azo-compounds to the t-aliphatic $\alpha$-alkoxy (or aryloxy) azo-alkanes is also described in U.S. patent application Ser. No. 149,041. When $R_5$ is a hydroxyalkyl or carboxyalkyl group, the compounds are preferentially prepared by preparing the corresponding acyloxyalkyl and alkoxycarbonylalkyl azo compounds and saponifying the esters at room temperature in alcoholic base. This prevents side reactions of substituent hydroxyl or carboxy groups reacting with the chloro groups to form cyclic compounds.

Right:

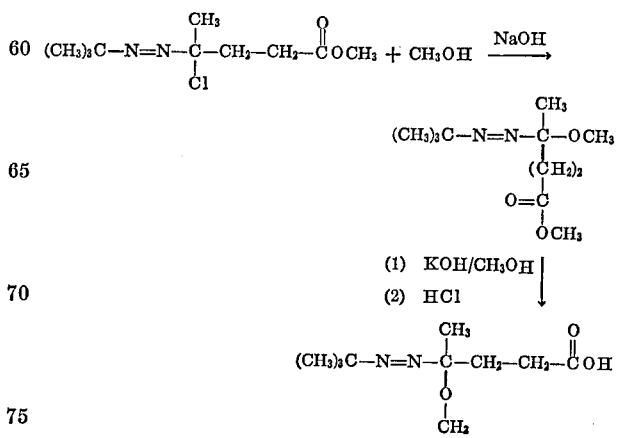

Wrong:

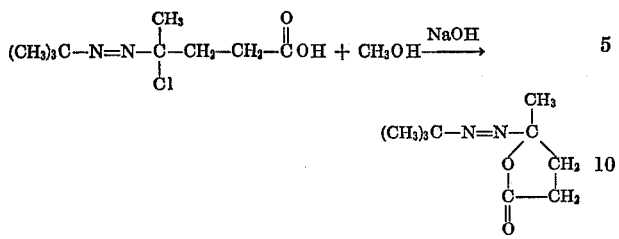

When $R_6$ is an aryl group the phenol (or naphthol) is much more acidic than methanol so the phenol (or naphthol) can be added to a basic solution of alcohol and be converted to its basic salt. Addition of the α-chloroazo to the methanol solution of the phenol or naphthol salt results in formation of the α-aryloxyazo with only a few percent of the α-methoxyazo forming.

The starting t-alkylhydrazones are prepared by azeotroping off the water of reaction from a benzene solution of the t-aliphatic hydrazine and the desired ketone. The process is described in U.S. patent application Ser. No. 149,041 mentioned above. Many of the t-aliphatic hydrazones can be prepared by refluxing an aqueous solution of the t-aliphatic hydrazine with the desired ketone. An improved process is described in U.S. patent application Ser. No. 853,523, filed Aug. 27, 1969, which disclosure is incorporated by reference. Suitable substituents can be introduced into the azo product by a judicial choice of ketone. Inert substituents such as halogens (beyond the α-position) cyano, aryl, alkoxy, aryloxy, ester and carbonate groups do not effect the overall reactions. Less reactive acyl groups, such as aroyl or highly sterically hindered acyl groups, may also be introduced as substituents by using diketones. Hydroxyl and carboxyl groups may be formed on the final azo product by saponifying ester substituents.

The overall reaction sequence follows:

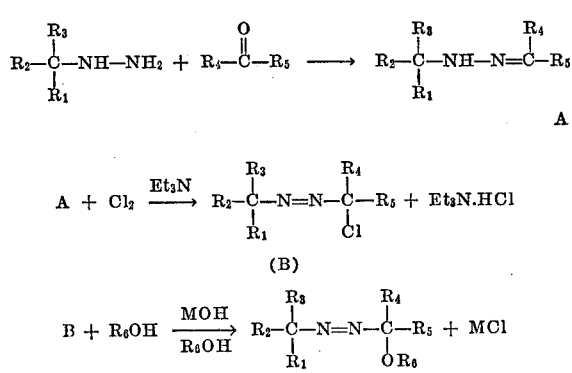

For purposes of illustration, the preparation of a few t-butylazo-α-chloro-alkanes and aralkanes and their conversion to the corresponding t-butylazo - α - methoxyalkanes and aralkanes is described below.

(a) Preparation of t-alkylazo (or t-aralkylazo)-α-chloroalkanes and aralkanes (Compounds 1–13)

Into a solution of 0.2 mole of the appropriate t-alkyl or t-aralkyl-hydrazone and 0.2 mole of triethylamine in 250 ml. of pentane, cooled to 0° C. in a 500 ml. 4 neck reaction flask, was added 0.2 mole of chlorine gas. The reaction mixture was stirred efficiently and the temperature held at 0° C.±5° C. during the addition. When the addition was complete, the reaction was stirred an adidtional 15 minutes and the insoluble triethylamine hydrochloride filtered off. The filter cake was washed with an additional 100 ml. of pentane and refiltered. The filtrates were combined and the pentane removed on a rotating evaporator to leave the yellow α-chloro-azoalkane or aralkane.

STRUCTURE

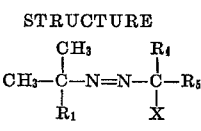

TABLE I

| Compound | X | R | $R_4$ | $R_5$ | Yield, percent |
|---|---|---|---|---|---|
| 1 | Cl | $CH_3$ | | $-(CH_2)_5$ | 91 |
| 2 | Cl | $CH_3$ | $CH_3$ | $i-C_4H_9$ | 92 |
| 3 | Cl | $CH_3$ | $i-C_4H_9$ | $i-C_4H_9$ | 83.5 |
| 4 | Cl | $CH_3$ | $CH_3$ | $-CH_2-\underset{\underset{CH_3}{O}}{\overset{CH_3}{C}}-CH_3$ | 91 |
| 5 | Cl | $CH_3$ | $CH_3$ | $C_6H_5$ | 94 |
| 6 | Cl | $CH_3$ | $CH_3$ | $-CH_2-C(CH_3)_3$ | 80 |
| 7 | Cl | $CH_3$ | $CH_3$ | $CH_3$ | 84 |
| 8 | Cl | $C_6H_5$ | $CH_3$ | $-i-C_4H_9$ | 95 |
| 9 | Cl | $C_6H_5$ | $CH_3$ | $CH_3$ | 97 |
| 10 | Cl | $CH_3$ | $CH_3$ | $nC_6H_{13}$ | 80 |
| 11 | Cl | $CH_3$ | $CH_3$ | $CH_2-CH_2-\overset{O}{\overset{\|}{C}}OnC_4H_9$ | 87 |
| 12 | Cl | $CH_3$ | | $-\underset{CH_3}{\overset{CH_3O}{C}}-\underset{CH_3}{\overset{CH_3}{C}}-\underset{}{\overset{}{C}}-$ | 90 |
| 13 | Cl | $CH_3$ | $CH_3$ | $-(CH_2)_3-O\overset{O}{\overset{\|}{C}}CH_3$ | 75 |

(b) Preparation of t-alkylazo (or t-aralkylazo)-α-methoxy-alkanes and aralkanes (Compounds 14–26)

To a solution of 0.2 mole of 50% NaOH in 200 ml. of methanol, cooled to 5° C. in an ice bath, was added 0.15 mole of the desired t-alkylazo (or t-aralkylazo)-α-chloro compound over 5–10 minutes. The reaction was stirred an additional ½ hour and poured into 500 ml. cold water. The product was extracted out of the water with 150 ml. pentane. The pentane solution was dried over anhydrous $Na_2SO_4$, filtered and the pentane evaporated on a rotating evaporator. Structure proofs were determined by infrared and nuclear magnetic resonance spectroscopy. The structures and yields are summarized in Table II.

(c) Preparation of t-alkylazo (or t-aralkylazo)-α-aryloxy-alkanes and aralkanes (Compounds 28–35)

To a solution of 0.2 mole of 50% NaOH and 0.2 mole of the appropriate phenol in 200 ml. of methanol, cooled to 5° C. in an ice bath, was added 0.15 mole of the desired t-alkylazo (or t-aralkylazo)-α-chloro compound over 5–10 minutes. The reaction was stirred an additional ½ hour and poured into 500 ml. cold water. The product was extracted out of the water with 150 ml. pentane. The pentane solution was dried over anhydrous $Na_2SO_4$, filtered and the pentane evaporated on a rotating evaporator. Structure proofs were determined by infrared and nuclear magnetic resonance spectroscopy. The structures and yields are summarized in Table II.

STRUCTURE

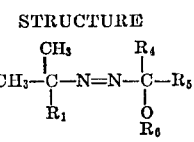

TABLE II

| Compound | $R_6$ | $R_1$ | $R_4$ | $R_5$ | Yield, percent |
|---|---|---|---|---|---|
| 14 | $CH_3$ | $CH_3$ | | $-(CH_2)_5-$ | 93 |
| 15 | $CH_3$ | $CH_3$ | $CH_3$ | $i-C_4H_9$ | 95 |
| 16 | $CH_3$ | $CH_3$ | $i-C_4H_9$ | $i-C_4H_9$ | 76 |
| 17 | $CH_3$ | $CH_3$ | $CH_3$ | $-CH_2-\underset{\underset{CH_3}{\mid}}{\overset{\overset{CH_3}{\mid}}{C}}-CH_3$ | 81 |
| 18 | $CH_3$ | $CH_3$ | $CH_3$ | $C_6H_5$ | 88 |
| 19 | $CH_3$ | $CH_3$ | $CH_3$ | $-CH_2-C(CH_3)_3$ | 80 |
| 20 | $CH_3$ | $C_6H_5$ | $CH_3$ | $-i-C_4H_9$ | 66 |
| 21 | $CH_3$ | $C_6H_5$ | $CH_3$ | $CH_3$ | 75 |
| 22 | $CH_3$ | $CH_3$ | $CH_3$ | $-n-C_6H_{13}$ | 91 |
| 23 | $CH_3$ | $CH_3$ | $CH_3$ | $-CH_2-CH_2-\overset{O}{\overset{\|}{C}}OC_4H_9$ | 82 |
| 24 | $CH_3$ | $CH_3$ | $CH_3$ | $CH_3$ | 74 |
| 25 | $CH_3$ | $CH_3$ | | $-\underset{\underset{CH_3}{\mid}}{\overset{\overset{CH_3}{\mid}}{C}}-\overset{O}{\overset{\|}{C}}-\underset{\underset{CH_3}{\mid}}{\overset{\overset{CH_3}{\mid}}{C}}-$ | 80 |
| 26 | $CH_3$ | $CH_3$ | $CH_3$ | $-(CH_2)_3-O\overset{O}{\overset{\|}{C}}CH_3$ | 40 |
| 27 | $CH_3$ | $CH_3$ | $CH_3$ | $-(CH_2)_3OH$ | *100 |
| 28 | $C_6H_5$ | $CH_3$ | $CH_3$ | $CH_3$ | 73 |
| 29 | $C_6H_5$ | $CH_3$ | $CH_3$ | $i-C_4H_9$ | 86 |
| 30 | $-\langle O \rangle-CH_3$ | $CH_3$ | $CH_3$ | $i-C_4H_9$ | 70 |
| 31 | $-\langle O \rangle-CH_3$ | $CH_3$ | $CH_3$ | $CH_3$ | 71 |
| 32 | $-\langle O \rangle$ with Cl, Cl, Cl | $CH_3$ | $CH_3$ | $i-C_4H_9$ | 97 |
| 33 | $-\langle O \rangle-Cl$ | $CH_3$ | $CH_3$ | $CH_3$ | 85 |
| 34 | $-\langle O \rangle-CH_3$ | $CH_3$ | $CH_3$ | $CH_3$ | 83 |
| 35 | $C_6H_5$ | $CH_3$ | $CH_3$ | $-(CH_2)_3O\overset{O}{\overset{\|}{C}}CH_3$ | 80 |
| 36 | $C_6H_5$ | $CH_3$ | $CH_3$ | $-(CH_2)_3OH$ | 100 |

*Compound 27 was obtained by saponifying compound 26 and compound 36 was obtained by saponifying compound 35.

This invention will be more clearly understood by the following specific examples in which, unless otherwise stated, parts are by weight and parts of the cross-linking agent are in milliequivalents.

(D) ILLUSTRATIVE EXAMPLES

Examples 1–10

These examples illustrate the cross-linking of polyethylene with various azo cross-linking agents of the generic Formula I.

The desired amount of azo cross-linking agent and of powdered polyethylene (Microthene) were weighed into a 600 ml. beaker and mixed by a combination of hand stirring with a spatula and shaking for about 5 minutes until a homogeneous blend was obtained. A 35 g. portion of the blend is then charged into a 5" x 5" x 0.075" cavity mold and cured at the temperature indicated. Thirty minute curing cycles were used in all cases. The percent insoluble polyethylene obtained after extracting the cured piece with xylene at 80° C. for 20 hours.

The results are summarized in Table III below. The following cross-linking agents were tested.

CONTROL

α,α Azobisisobutyronitrile (AIBN)

(1) 2-t-butylazo-2-methoxy-4-methylpentane

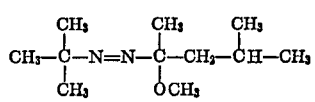

(2) 2-t-butylazo-2,4-dimethoxy-4-methylpentane

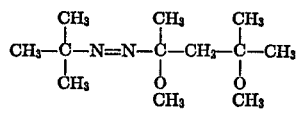

(3) 1-t-butylazo-1-methoxycyclohexane

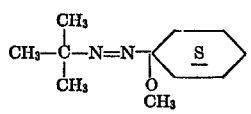

(4) 1,1'-azobis(1-methoxy-3,3,5-trimethylcyclohexane)

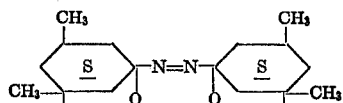

(5)–(8) 2-t-butylazo-2-alkoxy-4-methylpentanes

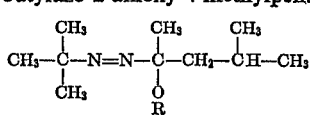

in which (5) $R=C_2H_5$
(6) $R=i-C_3H_7$
(7) $R=t-C_4H_9$ (8) $R=$ 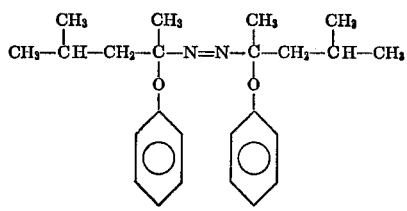

(9) 2,2'-azobis (2-phenoxy-4-methylpentane)

TABLE III

| Example: | °F. | Percent cross-linking at various levels of cross-linking agent | | | |
|---|---|---|---|---|---|
| | | 1 meq. | 5 meq. | 10 meq. | 15 meq. |
| 1 | 320 | 0 | | | 66.0 |
| 1 | 340 | 0 | 62.2 | 73.7 | 75.4 |
| 1 | 375 | 69.8 | 71.2 | 77.9 | 79.6 |
| 1 | 400 | | 70.4 | 76.1 | |
| 2 | 320 | 42.5 | 66.3 | 69.5 | 65.7 |
| 2 | 340 | 61.1 | 70.1 | 73.9 | 74.0 |
| 2 | 375 | 67.3 | 68.5 | 73.6 | 74.5 |
| 3 | 375 | 0 | | 70.9 | |
| 3 | 400 | 0 | 69.2 | 73.0 | 70.4 |
| 3 | 425 | | | 71.1 | |
| 4 | 340 | | | 70.5 | 73.5 |
| 4 | 375 | | | 68.3 | 71.0 |
| 5 | 320 | | | 64.2 | |
| 5 | 340 | | | 73.7 | |
| 5 | 375 | | | 76.8 | |
| 6 | 320 | | | 66.7 | |
| 6 | 340 | | | 73.4 | |
| 6 | 375 | | | 73.0 | |
| 7 | 375 | | | *69.9 | |
| 8 | 320 | | | 64.8 | |
| 8 | 340 | | | 66.1 | |
| 8 | 375 | | | 69.3 | |
| 9 | 375 | 0 | 65.9 | 68.1 | |
| 9 | 400 | | | 65.7 | |
| AIBN | 375 | | | 0 | |

Example 11

This example illustrates the cross-linking of silicone rubber.

To 100 g. silicone rubber (SE–404, General Electric) on a 2 roll rubber mill was added 1 meq. of 2-t-butylazo-2-methoxy-4-methylpentane (Example 1) and the mixture banded and resheeted twelve times to guarantee uniform dispersion of the curing agent. A portion of the mix was press cured at 375° F. for 30 minutes. The cross-linking was determined by measurement of tensile properties which are compared to the tensile properties obtained with the commercial peroxide. The commercial peroxide is 2,4-dichlorobenzoyl peroxide (Luperco CST) commonly used curing agent for silicone rubber and a 10 minute cure at 280° F. was used. The difference in curing temperature is due to the difference in half-life of the curing agents. As a control, α,α' azobisisobutyronitrile (AIBN) was used.

The results are summarized in Table IV.

TABLE IV

| | 2-t-butylazo-2-methoxy-4-methylpentane | Luperco CST | AIBN |
|---|---|---|---|
| Cure time (min.) | 30 | 10 | 30. |
| Cure temp. (° F.) | 375 | 280 | 300. |
| 300% modulus (p.s.i.) | 231 | 185 | No cure. |
| Ultimate tensile (p.s.i.) | 817 | 691 | Do. |
| Percent elongation | 667 | 612 | Do. |

Example 12

This example illustrates the cross-linking of poly-(ethylene vinyl acetate).

To 100 g. of poly (ethylene vinyl acetate) (EVA) (Ultrathene 234) on a 2 roll rubber mill was added 10 meq. of 2 - t - butylazo-2-methoxy-4-methylpentane and the mixture banded and resheeted twelve times to guarantee uniform dispersion of the curing agent. A portion of the mix was press cured at 375° F. for 30 minutes. The degree of cross-linking was determined by measuring the percent insoluble EVA by extracting the cured piece with xylene at 80° C. for 20 hours. Percent cross-linking =88.4%.

The above procedure was repeated with 10 meq. AIBN. No cross-linking could be detected by xylene extraction testing.

Example 13

This example illustrates the curing of styrene-butadiene rubber (SBR).

To 100 g. of SBR (Ameripol 1500), 7 g. Circosol (processing oil) and 50 g. HAF carbon black on a 2 roll rubber mill was added 10 meq. of 2-t-butylazo-2-methoxy-4-methylpentane and the mixture banded and resheeted twelve times to guarantee uniform dispersion of the mix ingredients. A portion of the mix was press cured for 30 minutes at 375° F. The following mechanical properties were obtained on the press cured sample:

Tensile strength, p.s.i. _____ 1159
Percent elongation at break _____ 912
300% modulus, p.s.i. _____ 241

The above procedure was repeated with 10 meq. AIBN as the cross-linking agent. The press cured (375/30 min.) sample was still plastic and did not show any tendency to be converted to a rubbery material.

Example 14

This example illustrates the curing of nitrile rubber.

The ingredients of mix A were banded on a 2 roll rubber mill, and 10 meq. of 2-t-butylazo-2-methoxy-4-methylpentane were added. The composition was banded and resheeted twelve times to guarantee uniform dispersion of the mix ingredients. A portion of the mix was press cured for 30 minutes at 375° F. The mechanical properties of cured nitrile rubber are:

300% modulus (p.s.i.) _____ 387
Ult. tensile (p.s.i.) _____ 941
Percent elongation _____ 612

Mix A

| | |
|---|---|
| Nitrile rubber (Chemigum N-6 butadiene acrylonitrile copolymer) | 100. |
| MT carbon black | 40. |
| SRF carbon black | 40. |
| ZnO | 5. |
| Stearic acid | 0.5. |
| Paraplex G-25 (glycol adipate plasticizer) | 15. |
| Dibutyl phthalate | 15. |
| 2 - t - butylazo-2-methoxy-4-methylpentane | 2.04 (10 meq.). |

The above procedure was repeated with 10 meq. AIBN as the cross-linking agent. The press cured (30 min./ 375° F.) sample was still plastic and did not show a tendency to be converted to a rubber material.

What is claimed is:

1. The process of cross-linking a methyl-vinyl base silicone rubber comprsing the steps of
   (1) incorporating into 100 parts by weight of said rubber 0.5 to 20 millimoles of a compound of the formula

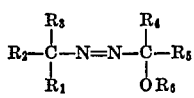

in which:
   $R_1$ is aliphatic hydrocarbon of 1–8 carbons, cyano, aromatic hydrocarbon of 6–14 carbons, aralkyl of 7–14 carbons or $R_6O$;

$R_2$, $R_3$ and $R_4$ are aliphatic hydrocarbon of 1–12 carbons, cycloaliphahtic hydrocarbon of 3–12 carbons or $R_2$ and $R_3$ join to participate in a bivalent aliphatic hydrocarbon group of 4–11 carbons which is unsubstituted or substituted with halo, cyano, alkyl, aryl, acyloxy or alkoxycarbonyl;

$R_5$ is aliphatic hydrocarbon of 1–12 carbons, cycloaliphatic hydrocarbon of 3–12 carbons, aryl, aryloxyalkyl, alkoxyalkyl, alkoxycarbonylalkyl, acyloxyalkyl, hydroxyalkyl, aralkyl, acylalkyl, carboxyalkyl, cyanoalkyl, haloalkyl, t-alkylperoxyalkyl, or joins with $R_4$ to participate in a bivalent aliphatic hydrocarbon group of 4–11 carbons which is unsubstituted or substituted with halo, cyano, aryl, acyloxy or alkoxycarbonyl; and $R_6$ is aliphatic hyhdrocarbon of 1–12 carbons, cycloaliphatic hydrocarbon of 3–12 carbons, aryl or aralkyl of up to 14 carbons;

(2) forming the rubber mixture into the desired shape; and
   (3) heating the rubber mixture at a temperature in the range of from about 250° F. to 450° F. until cross-linking is effected.

2. The process of claim 1 in which $R_1$ is alkyl or alkenyl of 1–4 carbons; cyano; phenyl; phenyl substituted with alkyl or alkoxy of 1–4 carbons, chloro or bromo; phenylalkyl in which the alkyl group has 1–4 carbons; phenylalkyl in which the alkyl group has 1–4 carbons and in which the phenyl group is substituted with alkyl or alkoxy of 1–4 carbons, chloro or bromo; or $R_6O$;

$R_2$, $R_3$ and $R_4$ are alkyl or alkenyl of 1–4 carbons or $R_2$ and $R_3$ join to participate in a bivalent alkylene radical of 4–6 carbons;

$R_5$ is alkyl or alkenyl of 1–4 carbons; cycloalkyl of 3–6 carbons; alkyl of 1–4 carbons substituted with phenyl, phenoxy, alkoxy of 1–4 carbons, hydroxy, carboxy, cyano, halo, t-alkylperoxy, alkoxycarbonyl having 1–4 carbons in the akoxy group, alkylcarbonyloxy having 1–4 carbons in the alkyl group, benzoyloxy, alkylcarbonyl having 1–4 carbons in the alkyl group or benzoyl; or joins with $R_4$ to participate in a bivalent alkylene radical of 4–6 carbons; and $R_6$ is alkyl or alkenyl of 1–4 carbons; phenyl; phenyl substituted with alkyl or alkoxy of 1–4 carbons, fluoro or bromo; phenylalkyl having 1–4 carbons in the alkyl group, or phenylalkyl having 1–4 carbons in the alkyl group and in which the phenyl group is substituted with alkyl or alkoxy of 1–4 carbons, chloro or bromo.

3. The process of claim 1 in which $R_1$, $R_2$, $R_3$, $R_4$, $R_5$ and $R_6$, each is an alkyl of 1 to 4 carbon atoms.

4. The process of claim 1 in which the cross-linking compound is 2-t-butylazo-2-methoxy-4-methylpentane.

5. The process of claim 1 in which the cross-linking agent is 2-t-butylazo-2,4-dimethoxy-4-methylpentane.

6. The proces of claim 1 in which the cross-linking agent is 1-t-butylazo-1-methoxy cyclohexane.

7. The process of claim 1 in which the cross-linking agent is 1,1'-azo bis-(1-methoxy-3,3,5-trimethylcyclohexane).

8. The process of claim 1 in which the cross-linking agent is 2-t-butylazo-2-ethoxy-4-methyl pentane.

9. The process of claim 1 in which the cross-linking agent is 2-t-butylazo-2-isopropoxy-4-methylpentane.

10. The process of claim 1 in which the cross-linking agent is 2-t-butylazo-2-t-butoxy-4-methylpentane.

11. The process of claim 1 in which the cross-linking agent is 2 - t - butylazo-2-(p-methyl-phenoxy)-4-methylpentane.

12. The process of claim 1 in which the cross-linking agent is 2,2'-azo bis-(2-phenoxy-4-methylpentane).

13. The proces of claim 1 in which the rubber mixture is heated to a temperature of 300–450° F. for a period of 10–200 minutes.

References Cited
UNITED STATES PATENTS

| | | | |
|---|---|---|---|
| 2,471,959 | 5/1949 | Hunt | 260—89.5 |
| 2,613,199 | 10/1952 | Di Giorgio et al. | 260—46.5 G |
| 3,152,107 | 10/1964 | Mullier et al. | 260—192 |
| 3,183,209 | 5/1965 | Hartung | 260—46.5 |
| 3,282,912 | 11/1966 | Benzing | 260—158 |

DONALD E. CZAJA, Primary Examiner

M. I. MARQUIS, Assistant Examiner

U.S. Cl. X.R.

260—31.2 R, 37 SB, 41 R, 41.5 R, 46.5 R, 46.5 UA, 83.3, 85.1, 87.3, 158